United States Patent [19]

Bottoms et al.

[11] Patent Number: 5,711,012
[45] Date of Patent: Jan. 20, 1998

[54] CELLULAR PHONE INTERFACE FOR A SIMULTANEOUS VOICE/DATA MODEM

[75] Inventors: Stanley Bottoms, Seminole; Gordon Bremer; Kenneth David Ko, both of Clearwater, all of Fla.; D. Randy Roberson, Hampton Cove, Ala.; Robert Earl Scott, Indian Rocks Beach, Fla.

[73] Assignee: Paradyne Corporation, Largo, Fla.

[21] Appl. No.: 639,359

[22] Filed: Apr. 26, 1996

Related U.S. Application Data

[63] Continuation of Ser. No. 283,333, Aug. 1, 1994.

[51] Int. Cl.⁶ .................................................. H04M 11/00
[52] U.S. Cl. .......................... 455/557; 375/222; 370/493
[58] Field of Search ..................... 379/93.09, 93.28, 379/99.37, 100.01, 100.15; 455/557; 375/222, 261; 370/493, 328, 522, 494, 495

[56] References Cited

U.S. PATENT DOCUMENTS

| | | | |
|---|---|---|---|
| Re. 34,034 | 7/1993 | O'Sullivan | 455/557 |
| 4,972,457 | 11/1990 | O'Sullivan | 379/59 |
| 4,991,197 | 2/1991 | Morris | 379/58 |
| 5,117,450 | 5/1992 | Joglekar et al. | 379/58 |
| 5,127,041 | 6/1992 | O'Sullivan | 379/59 |
| 5,282,238 | 1/1994 | Berland | 455/557 |
| 5,416,828 | 5/1995 | Hiramatsu | 455/557 |
| 5,440,585 | 8/1995 | Partridge, III | 375/222 X |
| 5,479,280 | 12/1995 | Scott | 375/222 |
| 5,479,479 | 12/1995 | Braitberg | 455/557 |
| 5,483,576 | 1/1996 | Staples | 455/557 |
| 5,509,050 | 4/1996 | Berland | 455/557 |
| 5,524,047 | 6/1996 | Brown | 379/93.28 |
| 5,537,436 | 7/1996 | Bottoms | 455/557 |
| 5,559,791 | 9/1996 | Bremer | 370/493 |
| 5,559,792 | 9/1996 | Bottoms | 370/493 |
| 5,581,560 | 12/1996 | Shimada | 370/493 |
| 5,594,952 | 1/1997 | Virtuoso | 375/222 |
| 5,602,902 | 2/1997 | Satterlund | 455/557 |
| 5,617,423 | 4/1997 | Li | 375/222 |

OTHER PUBLICATIONS

AB3X Cellular Interface Owner's Manual, Morrison & Dempsey Communications, 16 Nov. 1987. pp. 4, 14.

*Primary Examiner*—Dwayne Bost
*Assistant Examiner*—Brian L. Johnson
*Attorney, Agent, or Firm*—Thomas, Kayden, Horstemeyer & Risley

[57] ABSTRACT

An new cellular interface directly couples the speaker and microphone of a cellular telephone to a simultaneous voice and data (SVD) modem. This interface allows a cellular telephone user to use their cellular telephone for simultaneous voice and data communications over the cellular network. In addition, of the SVD modem has a port coupled to a switched facility of a switching system, this cellular interface allows the cellular telephone user to place a telephone call from their cellular telephone over the switched facility.

17 Claims, 3 Drawing Sheets

CELLULAR PHONE INTERFACE FOR A SIMULTANEOUS VOICE/DATA MODEM

This application is a continuation of application Ser. No. 08/283333, filed on Aug. 1, 1994.

BACKGROUND OF THE INVENTION

The present invention relates to communications equipment and, more particularly, to mobile voice and data communications.

The co-pending, commonly assigned, U.S. patent application of Bremer et al. entitled "Simultaneous Analog and Digital Communication," Ser. No. 08/076505, filed on Jun. 14, 1993, describes a simultaneous voice and data (SVD) modem in which a voice signal is added to a data signal for tansmission over a communications channel to a receiving SVD modem. As a result, this technique advantageously provides a voice-band signal, hereafter referred to as an SVD signal, that has both an audio channel and a data channel. This allows two users with SVD-capable modems m communicate data between them and talk at the same time—yet only requires one "tip/ring" type telephone line at each user's location.

Typically, an SVD modem is utilized in a public switched telephone network (PSTN) environment where the voice terminal equipment and the data terminal equipment are "located behind" the SVD modem. In other words, the SVD modem receives a voice signal and a data signal, and provides an SVD signal to the PSTN. However, in a cellular environment, any modem is usually "located behind" the cellular telephone. In other words, the cellular telephone either couples the modem signal to the cellular tansceiver—or—couples a voice signal from a cellular handset to the cellular tansceiver. Consequently, a user who desires to establish a cellular simultaneous voice and data connection must furnish another telephone-type device that is "located behind" the SVD modem in order to provide a voice signal to the SVD modem. The latter can then generate an SVD signal as the modem signal, which the cellular telephone couples to the cellular tansceiver.

SUMMARY OF THE INVENTION

This invention provides a new cellular modem interface that provides two additional signal connections between a modem and a cellular telephone. One signal connection conveys an output audio signal from a microphone of the cellular telephone, while the other signal connection conveys an input auto signal to a speaker of the cellular telephone. When using an SVD-capable modem, this new interface allows a user to use their cellular telephone as the source of the voice signal when establishing a cellular simultaneous voice and data connection. In addition, independent of whether or not the modem is SVD-capable, if the modem has another port coupled to the public switched telephone network (PSTN), this new interface allows the user to directly place a telephone call over the PSTN network from their cellular telephone.

DETAILED DESCRIPTION

Figure 1:
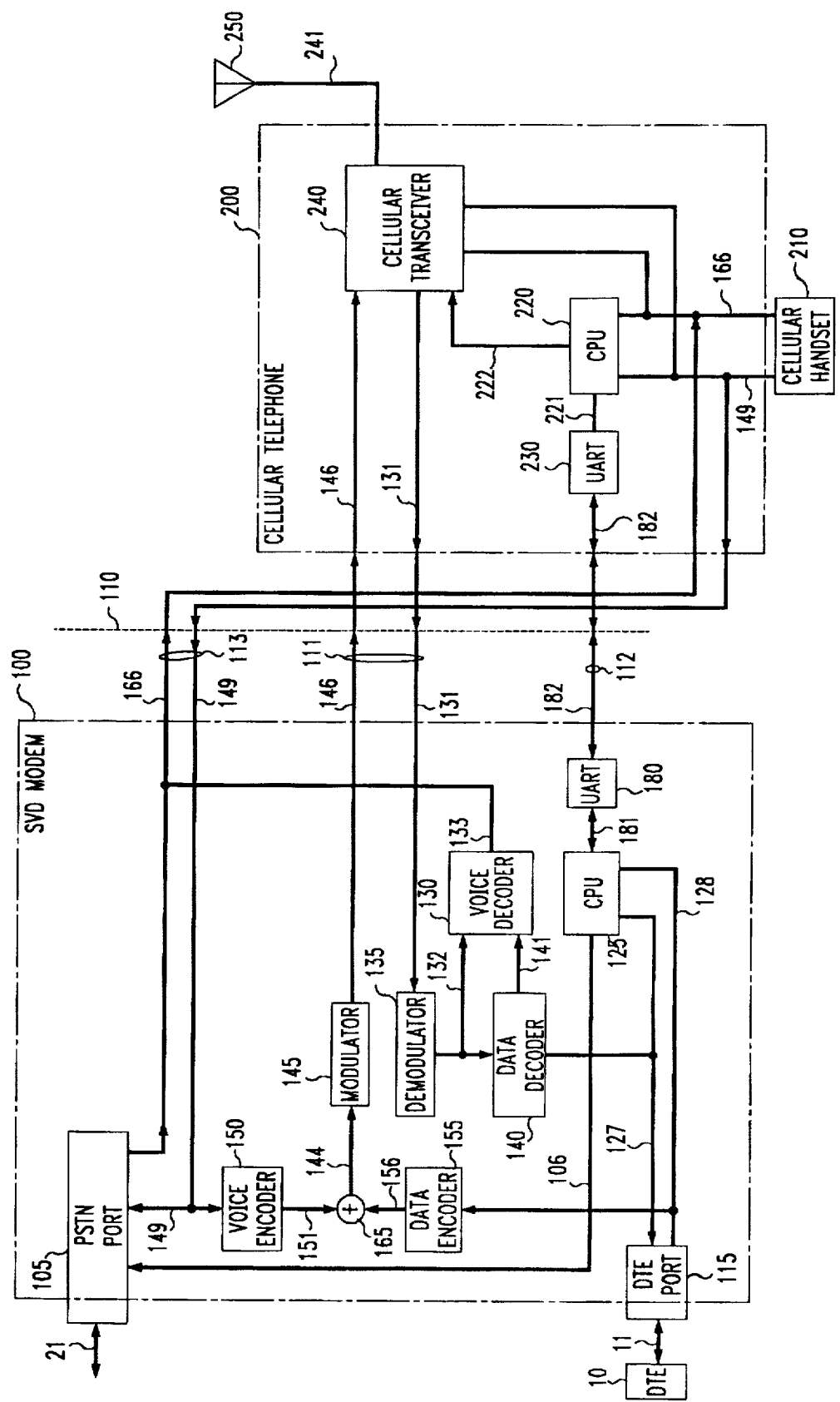
FIG. 1 shows a block diagram of a portion of a cellular simultaneous voice and data communications system embodying the principles of the invention.

A block diagram of the mobile portion of a cellular simultaneous voice and data communications system embodying the principles of the invention is shown in FIG. 1. This mobile communications equipment includes data terminal equipment (DTE) 10, SVD modem 100, and cellular telephone 200. Other than the inventive concept, the individual components of each of the mobile communications equipment are well-known and are not described in detail. For example, CPU 125, of SVD modem 100, and control processor 220 of cellular telephone 200 each include a microprocessor-based central processing unit, memory, and associated circuitry for controlling SVD modem 100 and cellular telephone 200, respectively. DTE 10 is illustratively a personal computer, e.g., a "laptop," that couples to DTE port 115 of SVD modem 100 via line 11. This DTE port illustratively conforms to Electronic Industry Association (EIA) standard RS-232 and couples not only data from DTE 10 for transmission to an opposite endpoint, but also couples commands from DTE 10 to SVD modem 100 during the well-known "AT command mode" of operation. The basic operation of an SVD modem, other than the inventive concept, is described below and also is described in the commonly assigned, co-pending, U.S. Patent application of Bremer et al. entitled "Simultaneous Analog and Digital Communication," Ser. No. 08/076505, filed on Jun. 14, 1993. Finally, other than the inventive concept, cellular telephone 200 functions as in the prior art.

As shown in FIG. 1, and in accordance with the inventive concept, SVD modem 100 is coupled to cellular telephone 200, via cellular interface 110. The latter includes three sets of signals: signal set 111, signal set 112, and signal set 113. As known in the prior art, signal set 111 and signal set 112 define what has been called a "direct connect" interface. This "direct connect" interface includes a data path, represented by signal set 112, and an analog signal path, represented by signal set 111. The data path passes control and status information between SVD modem 100 and cellular telephone 200, and is used primarily for establishing a call (dialing, answering, disconnecting, etc.). The data path is usually implemented as an asynchronous signaling scheme and uses Universal Asynchronous Receive/Transmit (UART) integrated circuits as illustrated by UART 180 of SVD modem 100 and UART 230 of cellular telephone 200. These UARTs pass data via line 182, which includes a transmit data (TXD) signal and a receive data (RXD) signal. In comparison, signal set 111 utilizes an existing analog input signal and analog output signal of the cellular telephone, where these analog signals, in a voice-only application, typically connect to an external microphone and speaker, respectively, of cellular telephone 200. In other words, the present state of the art allows an external modem or handset to replace the mouthpiece and ear-piece of a cellular handset 210 of cellular telephone 200 as the source and sink of any transmitted and received signals, respectively. Signal set 111 is a "4-wire" path, where two wires convey a transmit analog signal to cellular telephone 200. This is represented by line 146. The other two wires convey a receive analog signal provided by cellular telephone 200. This is represented by line 131. These analog signals normally share an analog ground, so in fact only three wires are used. However, since line 146 conveys the signal that is communicated over the cellular network and line 131 conveys the signal received from the cellular network, a cellular telephone user cannot utilize the simultaneous voice and data feature of SVD modem 100 unless the user connects an additional telephone set to SVD modem 100 via a telephone port (not shown). Therefore, and in accordance with the inventive concept, two additional signals are added to this "direct connect" interface, as represented by lines 149 and 166. The signal conveyed by line 149 corresponds to the microphone signal from cellular handset 210 and the signal conveyed by line 166 corresponds to the speaker signal subsequently provided to cellular handset 210.

In accordance with the inventive concept, the mobile communications equipment of FIG. 1 is capable of operating in at least four different modes of operation: a "voice-only-cellular" mode, a "data-only-cellular" mode, an "SVD-cellular" mode, and a "voice-only-PSTN" mode. In the "voice-only-cellular" mode and the "data-only-cellular" mode, the mobile communications equipment functions as in the prior art. It is assumed that absent a command from SVD modem 100, cellular telephone 200 defaults to the "voice-only-cellular" mode of operation. In this mode, SVD modem 100 does not provide a data signal for transmission. Instead, only a voice signal is provided by cellular handset 210 on line 149 to cellular transceiver 240, which is under the control of control processor 220 via line 222. For example, in "voice-only-cellular" mode, control processor 220 signals cellular transceiver 240 to transmit and receive signals via lines 149 and 166, respectively. Cellular transceiver 240 modulates the voice signal on line 149 for transmission over the cellular network (not shown) via antenna 250. Similarly, in the reverse direction, any received cellular signal from antenna 250 is demodulated by cellular transceiver 240, which provides a received voice signal to cellular handset 210 via line 166.

In addition to the above-described modes of operation for the cellular communications system, SVD modem 100 itself operates in either a "voice-only" mode, a "data-only" mode, or an SVD mode. The "voice-only" mode simply communicates a signal, e.g., a voice signal, present on one analog port of SVD modem 100 to the other. The "data-only" mode modulates a data signal received via DTE port 115 for transmission via cellular port 110 to a remote data endpoint, and demodulates a modulated data signal received via cellular port 110 for transmission to DTE 10. Finally, the SVD mode provides the combination of the "voice-only" and "data-only" mode with the exception that the signal received and transmitted via cellular port 110 is a combined voice and data signal, i.e., the above-mentioned SVD signal. A user switches between these modes of operation by the entry of a predefined command mode instruction via DTE 10. Upon receipt of this predefined command mode instruction, CPU 125 uses the above-mentioned data path represented by signal set 112 to also switch cellular telephone 220 to the appropriate mode of operation.

If a command mode instruction associated with the "voice-only" mode of operation is received by CPU 125 of SVD modem 100, CPU 125 enables PSTN port 105, which then couples lines 149 and 166 to line 21. The latter is a typical "tip/ring" facility, i.e., a wire-pair, upon which a voice-band signal is transmitted between SVD modem 100 and a switching system (not shown) of the public switched telephone network. The remaining components, e.g., data encoder 155, data decoder 140, voice decoder 130, and voice encoder 150, are disabled by control signals (not shown) from CPU 125. The latter also signals control processor 220 to disable cellular transceiver 240. This is effected by a predefined command to CPU 220 of cellular telephone 200. Consequently, in the "voice-only" mode of SVD modem 100 any analog signal appearing at cellular port 110 is coupled, or bridged, to the PSTN port 105. As a result, and in accordance with the principles of the invention, it is possible for a user to utilize cellular telephone 200 in establishing a telephone call over the PSTN without establishing a cellular connection. This is the "voice-only-PSTN" mode of operation. Indeed, a user can either perform "keyboard" dialing as known in the art from DTE 10, or by directly pressing the keys of a keypad (not shown) associated with cellular handset 210. It is assumed that either cellular handset 210, or equivalently control processor 220 provides the dual tone multi-frequency (DTMF) digits on line 149.

In the "data-only-cellular" mode, SVD modem 100 is placed into the "data-only" mode of operation, e.g., via a predefined command mode instruction provided by a user located at DTE 10. In this mode of operation, signal set 111 conveys, the transmitted and received signals. There is no transmission of a voice signal. CPU 125, of SVD modem 100, disables PSTN port 105 and enables via control signals (not shown) data encoder 155, modulator 145, demodulator 135 and data decoder 140; and disables via control signals (not shown) voice encoder 150 and voice decoder 130. In this mode of operation, any data signal appearing at DTE port 115 (assuming SVD modem 100 is not receiving "AT commands") is modulated by SVD modem 100 for transmission to an opposite endpoint (not shown). SVD modem 100 modulates this data signal, e.g., according to CCITT standard V.32bis. Data encoder 155 includes any of the well-known encoding techniques like scrambling, trellis-coding, etc., to provide a sequence of symbols on line 156 at a symbol rate, 1/T to modulator 145. The symbols are selected from a two-dimensional signal space (not shown). Note, since voice encoder 150 is disabled, adder 165 does not add a signal to the output signal from data encoder 155. Modulator 145 illustratively provides a quadrature amplitude modulated signal (QAM) to cellular telephone 200 via line 146. In accordance with the "data-only" mode of SVD modem 100, CPU 125 of SVD modem 100 signals cellular telephone 200, via signal set 112, to use signal set 111 in the transmission and reception of cellular signals as opposed to lines 166 and 149, which couple to cellular handset 210. Cellular transceiver 240, which is under the control of control processor 220 via line 222, again modulates the modulated data signal provided by SVD modem 100 for transmission over a cellular network (not shown) via antenna 250. Similarly, in the reverse direction, cellular transceiver 240 provides a received QAM signal on line 131 of cellular interface 110. Demodulator 135, of SVD modem 100, alemodulates the received QAM signal and provides an encoded data stream to data decoder 140. The latter performs the inverse function of data encoder 155 and provides a received data signal to DTE port 115 for transmission to DTE 10. Thus, the cellular communications equipment shown in FIG. 1 operates in the "data-only-cellular" mode of operation.

Finally, if a user desires simultaneous voice and data transmission over the cellular network, the user provides a predefined command mode instruction to SVD modem 100 to switch to the SVD mode of operation. In this mode of operation, CPU 125 enables, via control signals (not shown), data encoder 155, modulator 145, demodulator 135, voice encoder 150 and voice decoder 130. In addition, CPU 125 signals cellular telephone 200, via signal set 112, to use signal set 111 in the transmission and reception of cellular signals. In this mode, and in accordance with the principle of the invention, any analog signal, e.g., a voice signal, appearing on line 149 from cellular handset 210 is applied to voice encoder 150. The latter processes the voice signal so that it is mapped into the two-dimensional signal space used by data encoder 155 to provide a voice signal point. This voice signal point defines the magnitude and angle of a "voice signal vector" about the origin of the two-dimensional signal space. Voice encoder 150 provides a sequence of two-dimensional signal points, at the predefined symbol rate of 1/T symbols per sec., on line 151. Adder 165 adds each voice signal vector on line 151, if any, to a respective one of the symbols provided by data encoder 155 to provide a stream of signal points to modulator 145. As described above, modulator 145 provides a QAM modulated signal to cellular telephone 200 via cellular interface 110. This QAM modulated signal is the above-mentioned SVD signal since it represents both voice and data.

In the reverse direction, the received SVD signal on line 131 provided by cellular transceiver 240 is processed, as described above, by demodulator 135 and data decoder 140 to provide the received data signal on line 127. In addition, voice decoder 130 receives both the received signal point sequence from demodulator 135 and the decoded symbol sequence from data decoder 140. Voice decoder 130 includes suitable buffering to allow for the decoding time needed by data decoder 140 to make a decision as to a received symbol. Voice decoder 130 subtracts the received symbol provided by data decoder 140 from the respective received signal point provided by demodulator 135 to yield the voice signal vector and then performs the inverse function of voice encoder 150 to provide a received voice signal to the speaker (not shown) of cellular handset 100 via line 166.

Figure 2:
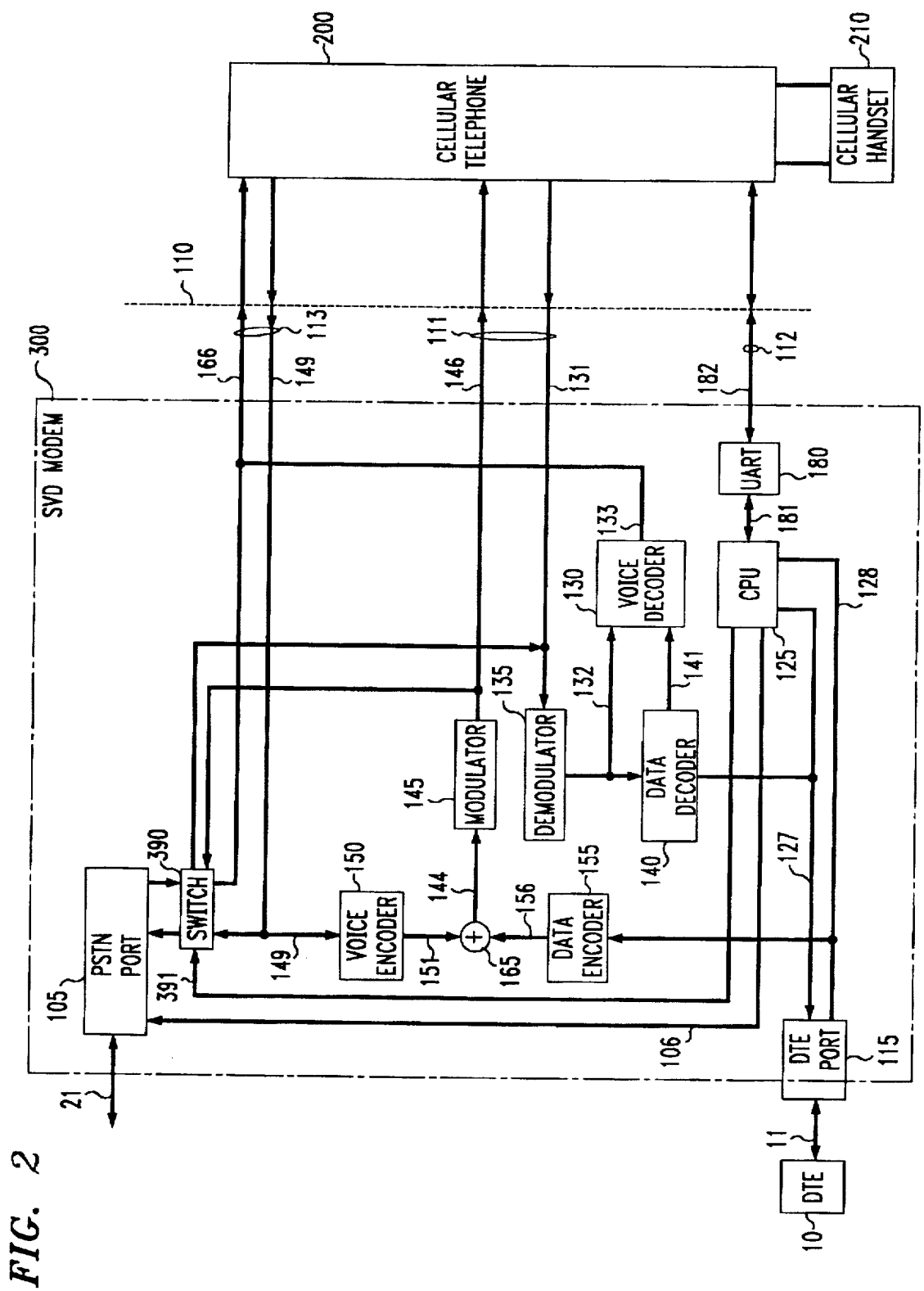
FIG. 2 shows another block diagram of a portion of a cellular communications system embodying the principles of the invention.

Turning now to FIG. 2, another embodiment of the inventive concept is shown. SVD modem 300 of FIG. 2 is identical to SVD modem 100 of FIG. 1 except for the inclusion of switch 390 in SVD modem 300. CPU 125 controls switch 390 via line 391 to either couple signal set 113 to PSTN port 105 or couple modulator 145 and demodulator 135 to PSTN port 105. The inclusion of switch 390 allows SVD modem 300 to provide data connectivity over a switched facility. In the above-described "voice-only" mode of operation, CPU 125 of SVD modem 300 additionally controls switch 390 to couple signal set 113 to PSTN port 105. However, the inclusion of switch 390 allows SVD modem 300 to have two additional predefined modes of operation—the "data-only-PSTN" mode and the "SVD-PSTN" mode. These predefined modes of operation are selected "a priori" by a user located at DTE 10 via a predefined command mode instruction. If a user selects the "data-only-PSTN" mode of operation, CPU 125 controls switch 390 to couple PSTN port 105 to modulator 145 and to demodulator 135. Cellular telephone 200 functions as in the above-described "voice-only-PSTN" mode of operation, i.e., no signals are transmitted from cellular transceiver 240 over the cellular network. Similarly, if a user selects the "SVD-PSTN" mode, the operation of the equipment is similar except that CPU 125 additionally enables voice encoder 150 and voice decoder 130. In this case, an SVD signal is generated by modulator 145 for transmission over a switched facility coupled to PSTN port 105. As a result, the "SVD-PSTN" mode of operation allows a cellular user to utilize cellular telephone 200 in a simultaneous voice/data connection over the PSTN, i.e., no connection is made over the cellular network. Consequently, in this embodiment, the mobile communications equipment of FIG. 2 allows a user to not only establish a data connection over a switched facility, but also allows a user to utilize cellular telephone 200 in establishing an SVD connection over a switched facility.

As a result, new cellular interface 100 advantageously allows a user to utilize the cellular handset of a cellular telephone in an SVD communication session. This advantageously eliminates the requirement that a user of an SVD modem provide additional voice terminal equipment in order to establish a cellular SVD connection. In addition, this invention simplifies any cabling arrangements and allows the use of the cellular telephone's battery (not shown) as the source of audio power instead of using the associated DTE as the source of power. Finally, as described above, the user can establish a PSTN-only call directly from the cellular telephone.

Figure 3:
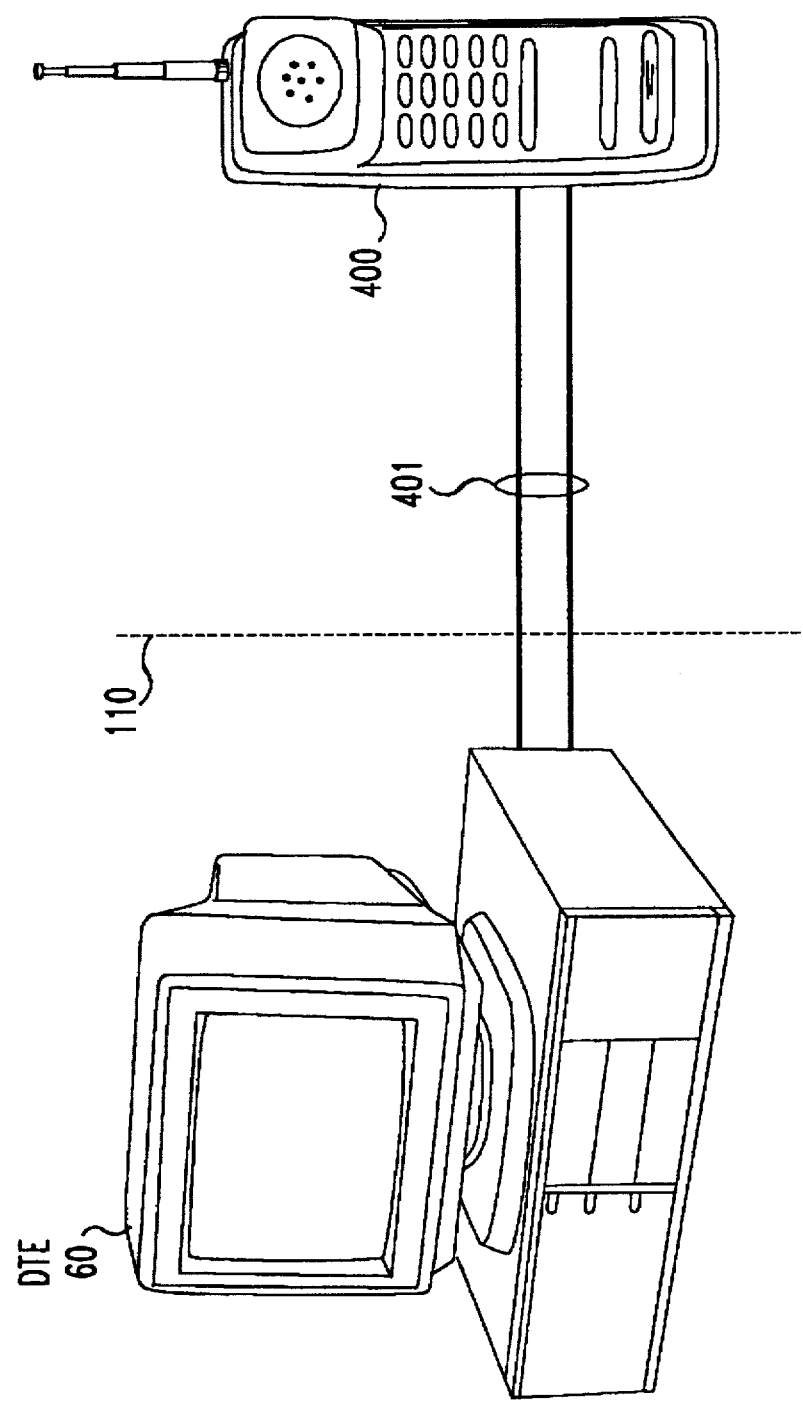
FIG. 3 shows another block diagram of a portion of a cellular communications system embodying the principles of the invention.

Also, it should be noted that the above-described SVD modem was merely representative of any device that can couple to a cellular telephone via this new interface and thus provide the cellular telephone user with a new set of features. This is illustrated in FIG. 3, which shows a personal computer, DTE 60, directly coupled to cellular telephone 400, via cable 401. Cellular telephone 400 is a "handheld" version of a cellular telephone, and is functionally equivalent to cellular telephone 200 and cellular handset 210, both of which have been described above. Cable 401 provides cellular interface 110 and allows DTE 60 to provide additional features like voice storage and recording. For example, upon receiving an indicator of an incoming call indication from CPU 220 of cellular telephone 200, via signal set 112, DTE 60 instructs CPU 220 of cellular telephone 200 to answer the call. DTE 60 then plays-back a prerecorded voice message to the calling party and allows the calling party to store a voice message on DTE 60. The prerecorded voice message is provided by a user via the microphone of cellular telephone 200 in accordance with the principles of the invention Another alternative is to provide a separate RJ-11 jack to cellular telephone 200 to allow direct coupling to any switched line facility. A cellular user could then, via cellular handset 210, control whether or not cellular telephone 200 uses cellular transceiver 240 to establish the call or simply redirects the analog signals from the cellular handset to the switched line facility coupled to the RJ-11 jack.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., encoders, decoders, voice modifiers, etc., the functions of any one or more of those building blocks can be carried out using one or more appropriate programmed processors, e.g., a digital signal processor.

In addition, SVD modem 100 could couple to DTE 10 via a "PCMCIA" interface. Also, although the inventive concept was described in the context of an SVD signal, it should be realized that other forms of simultaneous voice and data transmission could be used, e.g., simple time-division multiplexing of a digitized voice signal and a data signal. In this case, the audio signal provided by cellular telephone 200 could be digital or analog, which is then digitized, e.g., by an associated modem. Finally, although the selection of modes was illustrated by the use of a predefined command mode instruction any equivalent "access selector" can be used.

We claim:

1. Apparatus for use in a cellular telephone arrangement, wherein a cellular telephone comprises a cellular transceiver section and a cellular handset such that the cellular handset is plugged into the cellular transceiver section for communicating via a cellular transceiver over a cellular network, the apparatus comprising:

a cable that couples a modem to the cellular transceiver section, wherein the cable includes a plurality of conductors for a) communicating signaling between the modem and the cellular transceiver for communication over the cellular network and b) communicating signaling between the modem and the cellular handset even though the cellular handset is plugged into the cellular transceiver section for communicating directly with the cellular transceiver.

2. The apparatus of claim 1 wherein the signaling communicated between the modem and the cellular handset includes a microphone signal derived from a microphone of the cellular handset and a speaker signal for application to a speaker of the cellular handset.

3. An improved modem for use in cellular telephone arrangement wherein a cellular telephone comprises a cellular transceiver section and a cellular handset such that the cellular handset is plugged into the cellular transceiver section for communicating via a cellular transceiver over a cellular network, wherein the improved modem comprises:

a cellular telephone interface port that is adapted for a) communicating signaling between the modem and the cellular transceiver for communication over the cellular network and b) communicating signaling between the modem and the cellular handset even though the cellular handset is plugged into the cellular transceiver section for communicating directly with the cellular transceiver.

4. The apparatus of claim 3 wherein the signaling communicated between the modem and the cellular handset includes a microphone signal derived from a microphone of the cellular handset and a speaker signal for application to a speaker of the cellular handset.

5. The apparatus of claim 3 wherein the improved modem further comprises coupling circuitry for communicating the signaling between the modem and cellular handset to another interface port of the modem that is used for coupling to a non-cellular telephone line for communication over a telephone network.

6. A cellular telephone comprising:

a cellular transceiver;

a cellular handset;

a cellular interface port; and control circuitry able to couple the cellular handset to the cellular transceiver for communicating over a cellular network, said control circuitry able to couple the cellular handset to the cellular interface port for communicating with a modem attached thereto, said control circuitry responsive to a command signal received via the cellular interface port for either a) coupling the cellular handset to the cellular transceiver for communicating over a cellular network; or b) coupling the cellular handset to the cellular interface port for communicating with a modem attached thereto.

7. A cellular telephone comprising:

a cellular transceiver;

a cellular handset;

a cellular interface port; and control circuitry able to cause the cellular transceiver to process audio signaling from the cellular handset for communicating over a cellular network, said control circuitry able to couple the cellular handset to the cellular interface port for communicating with a modem attached thereto such that the modem ignores any audio signaling from the cellular handset, said control circuitry responsive to a command signal received via the cellular interface port for either a) causing the cellular transceiver to process audio signaling from the cellular handset for communicating over a cellular network or b) coupling the cellular handset to the cellular interface port for communicating with a modem attached thereto such that the cellular transceiver ignores any audio signaling from the cellular handset.

8. A method for use in a modem, the method comprising the steps of:

selecting a mode of operation from a number of modes of operation, wherein the number of modes of operation include at least a voice-only mode, and a voice-and-data mode; and providing control signaling to a cellular telephone, which includes a cellular handset and a cellular transceiver;

wherein the control signaling causes the cellular telephone to operate differently depending on the selected mode of operation such that in the voice-only mode signaling from the cellular handset is communicated to the cellular transceiver for communication over a cellular network, but in the voice-and-data mode said signaling is communicated from the cellular handset to the modem for subsequent communication over the cellular network, via the cellular transceiver.

9. The method of claim 8 wherein the control signaling is representative of a set of predefined commands stored within the modem that control the operation of the cellular telephone in accordance with the selected mode of operation.

10. A method for use in a modem, the method comprising the steps of:

coupling to a cellular telephone that includes a cellular transceiver and a cellular handset;

selecting one of a number of modes of operation, where the modes of operation include at least a voice-only mode, and a voice-and-data mode; and causing the cellular telephone to operate differently depending on the selected one of the number of modes such that in the voice-only mode control circuitry of the cellular telephone couples the cellular transceiver to the cellular handset but in the voice-and-data mode the control circuitry couples the cellular handset to the modem and not to the cellular transceiver.

11. The method of claim 10 wherein the causing step includes the step of providing control signaling to the cellular telephone, the control signaling representative of predefined commands that control the operation of said control circuitry of the cellular telephone in accordance with the selected mode of operation.

12. A method for use in a modem, the method comprising the steps of:

selecting one of a number of modes of operation, where the modes of operation include at least a cellular-voice-only mode, a land-line-voice-only mode, and a cellular voice-and-data mode; and providing control signaling to a cellular telephone, which includes a cellular handset and a cellular transceiver;

wherein the control signaling causes the cellular telephone to operate differently depending on the selected one of the number of modes such that in the cellular-voice-only mode control circuitry of the cellular telephone couples the cellular transceiver to the cellular handset, but in both the land-line-voice-only mode and the cellular-voice-and-data mode the control circuitry couples the cellular handset to the modem and not to the cellular transceiver.

13. The method of claim 12 wherein the control signaling is representative of a set of predefined commands stored within the modem that control the operation of the cellular telephone in accordance with the selected mode of operation.

14. A method for use in a modem, the method comprising the steps of:

coupling to a cellular telephone that includes a cellular transceiver and a cellular handset;

selecting one of a number of modes of operation, where the modes of operation include at least a cellular-voice-only mode, a land-line-voice-only-mode, and a cellular voice-and-data mode; and causing the cellular telephone to operate differently depending on the selected one of the number of modes such that in the cellular-voice-only mode control circuitry of the cellular telephone couples the cellular transceiver to the cellular handset but in both the cellular-voice-and-data mode and the land-line-voice-only-mode the control circuitry couples the cellular handset to the modem and not to the cellular transceiver.

15. The method of claim 14 wherein the causing step includes the step of providing control signaling to the cellular telephone, the control signaling representative of predefined commands that control the operation of said control circuitry of the cellular telephone in accordance with the selected mode of operation.

16. The method of claim 14 such that when the modem is in the land-line-voice-only mode of operation, the method further comprises the step of communicating signaling from the cellular handset to an interface port of the modem, said interface port used for coupling to a land-line facility of a telephone network.

17. The method of claim 14 such that when the modem is in the cellular-voice-and-data mode of operation, the method further comprises the steps of modulating signaling from the cellular handset for transmission as part of a voice and data signal; and communicating the voice and data signal to the cellular transceiver for transmission over a cellular network.

* * * * *

UNITED STATES PATENT AND TRADEMARK OFFICE
CERTIFICATE OF CORRECTION

PATENT NO. : 5,711,012
DATED : January 20, 1998
INVENTOR(S) : Bottoms et al

It is certified that error appears in the above-identified patent and that said Letters Patent is hereby corrected as shown below:

On the title page: Item [57] Abstract
line 58, under the heading "Abstract", after "addition," delete "of" and insert therefore --if--.

Column 1, line 22, before "communicate" delete "m" and insert therefore --to--.

Column 1, line 33, after "cellular" delete "tansceiver" and insert therefore --transceiver--.

Column 1, line 35, after "cellular" delete "tansceiver" and insert therefore --transceiver--.

Column 1, line 41, after "cellular" delete "tansceiver" and insert therefore --transceiver--.

Column 1, line 49, after "input" delete "auto" and insert therefore --audio--.

Column 3, line 23, after "voice" delete "signaL" and insert therefore --signal--.

Column 4, line 18, after "conveys" delete the comma.

Column 4, line 50, delete "alemodulates" and insert therefore --demodulates--.

Signed and Sealed this

Twenty-eighth Day of April, 1998

Attest:

Attesting Officer

BRUCE LEHMAN

*Commissioner of Patents and Trademarks*